United States Patent
Van Gasse et al.

[15] 3,652,356
[45] Mar. 28, 1972

[54] PROCESS FOR MAKING REINFORCED POLYESTER LAMINATES UTILIZING IRRADIATION

[72] Inventors: Rene L. E. Van Gasse, Schoten, Belgium; Petrus J. C. A. Simonis, Maassluis, Netherlands

[73] Assignee: N.V. Chemische Industrie "Synres", Hoek von Holland, Netherlands

[22] Filed: Feb. 6, 1968

[21] Appl. No.: 703,459

[30] Foreign Application Priority Data

Feb. 7, 1967 Netherlands...........................6701813

[52] U.S. Cl..............................156/179, 156/206, 156/272, 156/277
[51] Int. Cl........................................................B32b 5/00
[58] Field of Search ..........................156/206, 272, 327, 179

[56] References Cited

UNITED STATES PATENTS 3,250,642  5/1966  Parasacco et al..................156/272 X
3,424,638  1/1969  Marans..................................156/272

Primary Examiner—Leland A. Sebastian
Assistant Examiner—Stephen J. Lechert, Jr.
Attorney—Waters, Roditi, Schwartz & Nissen

[57] ABSTRACT

Reinforced polyester laminates are made by building up a laminate from unsaturated polyester resin and reinforcing material, such as glass fiber matting, the laminate being sandwiched between two foils during the polymerization and curing, and the polyester resin being polymerized by irradiation with high-energy electrons. Preferably the laminate is provided with permanent foils, produced by applying foils of unsaturated polyester resin in partly polymerized state to the laminate on both sides thereof and then irradiating the composite laminate with high-energy electrons to complete polymerization, whereby the foils are firmly bonded to the laminate.

11 Claims, 1 Drawing Figure

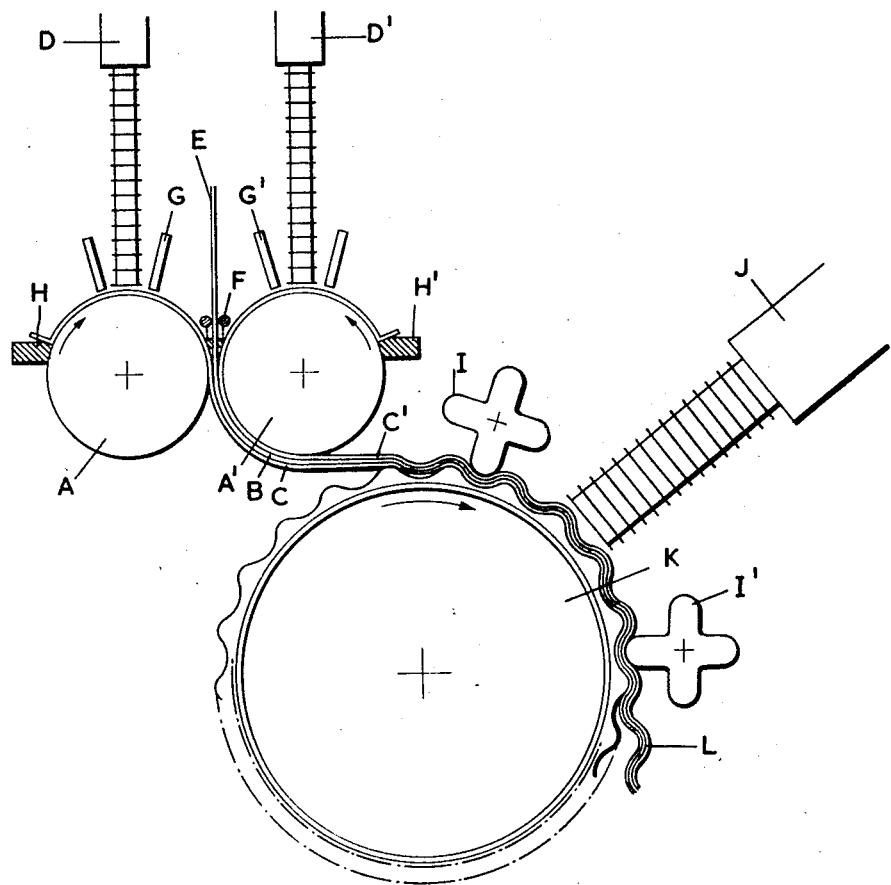

PROCESS FOR MAKING REINFORCED POLYESTER LAMINATES UTILIZING IRRADIATION

This invention relates to a process for making reinforced polyester laminates.

In the conventional processes for making reinforced polyester laminates, particularly glass fiber reinforced polyester laminates, the polymerization of the unsaturated polyester is effected under the influence of catalysts (usually peroxides) in the absence or presence of metal salts and/or amines as accelerators and with or without the supply of additional heat.

As is well-known, the polymerization proceeds as a result of the formation of free radicals from the catalysts, which initiate the reaction.

It is known to cause polymerizations to proceed under the influence of free radicals produced by irradiation with high-energy energy electrons. Reinforced polyester laminates, however, have never been produced in this manner.

The present invention relates to a process for making reinforced polyester laminates by building up a resin laminate from unsaturated polyester resin and reinforcing material, particularly fibrous material, on a substrate, wherein the polyester laminate is sandwiched between two foils during the polymerization and the curing, and wherein the polyester resin is polymerized by irradiation with high-energy electrons.

In addition to the face that it is thus possible to work more quickly than with the known methods, the final product can acquire greater degree of polymerization, so that a higher resistance to water and other atmospheric influences is obtained.

As the material for the foils between which the laminate is sandwiched during the polymerization and the curing, cellophane and saturated polyester resins are used (namely, polyterephthalic acid esters, "Mylar," Dupont de Nemours; "Melinex" I.C.I.). The only purpose of these foils is to support the laminates during the polymerization and to prevent contact with the air, and they are again removed after the laminates have cured. They can only be used once or a limited number of times.

According to co-pending application Ser. No. 619,933 now abandoned however, it is possible to replace the temporary foils by permanent foils, namely, by using foils of unsaturated polyester resin. The laminates then have better weather resistance. These foils may be made in various manners, but particularly also by irradiation with high-energy electrons, for example, as described in co-pending application Ser. No. 651,518 now abandoned, by applying a radiation energy exceeding $1 \times 10^8$ erg./g./sec., which makes it necessary for the equivalent ratio of unsaturated monomer to ethylenically unsaturated bonds in the polyester chain to be between 1.0 and 1.7. In this way, the manufacture can take place in a few seconds, and a polymerization degree of more than 90 percent can be obtained.

Preferably, therefore, the subject process is combined with one for the manufacture of polyester foils for use in making polyester laminates provided with a permanent polyester foil, namely, by sandwiching the polyester laminate during the polymerization and the curing between two foils of partly polymerized unsaturated polyester resin, and discharging the product as a unit with the foils after the irradiation of the laminate with the foils.

In this embodiment, the unsaturated polyester resin used both for the laminate and for the foils preferably has an equivalent ratio of unsaturated monomer to ethylenically unsaturated bonds in the polyester chain of from 1.0 to 1.7, and the partial polymerization of the foils is preferably also effected by high-energy irradiation.

In this manner it is possible to obtain a polymerization degree of the whole unit of above 90 percent.

Although the reinforcement of the polyester resins preferably consists of glass fibers, it may in some cases by recommendable to replace this fibrous material, either in part or in full, by a wire reinforcement.

It is also possible to use paper as the reinforcement, which may be printed with decorative patterns.

The partly polymerized polyester foils may be printed or colored before being united with the reinforced polyester laminate by further polymerization.

Apart from the irradiation step, the manufacture of the laminates may be effected in any suitable manner. In the embodiment in which polyester foils are used, the manufacture is preferably as described in the following example, that is, by using rollers, which may, however, be replaced by metal belts.

The example describes the manufacture of corrugated polyester laminates with reference to the accompanying drawing, which is a diagrammatic showing of a side-view of apparatus for carrying out the method according to the invention.

Referring to the drawing, a film consisting of unsaturated polyester resin, produced by the esterification of 1 phthalic acid anhydride
1 mole fumaric acid and
2.2 moles propanediol-1.2 dissolved in styrene, is applied to each of the rollers A and A' by means of the devices H and H'. Both films are partly polymerized on the roller by passing them under the electron radiators D and D', whereby an amount of energy of $2 \times 10^8$ erg./g./sec. is absorbed.

Supplied to the nip between the rollers A and A' is also a glass fiber matting E, which is on both sides sprayed with an unsaturated polyester resin produced by the esterification of 1 mole phthalic acid anhydride
1 mole propanediol-
2.2 moles propanediol—1.2 dissolved in styrene.

The laminate B with the two foils or films C spray-devices C', discharged at the bottom of the rollers, is subsequently pressed into the mold K by means of dies I and I', it being retained in the mold by suction and further passing one or more electron radiators J, for it to be polymerized with a quantity of absorbed energy of $4 \times 10^8$ erg./g./sec., whereby the foils are firmly bonded to the laminate. A corrugated laminate leaves the mold at L.

Screen plates G and G' prevent the resin in the spray- F and H to be polymerized prematurely under the influence of the radiation.

We claim:

1. A process for the manufacture of reinforced polyester sheeting comprising impregnating a fibrous or filamentary reinforcing material with an unsaturated polyester composition comprising a solution of an unsaturated polyester in an olefinically unsaturated monomer, to produce a resin impregnated sheet, applying a thermoplastic film to each side of the sheet and subjecting the thus obtained laminate to irradiation with high-energy electrons to polymerize and cure the unsaturated polyester composition to thereby bond said films integrally to the sheet.

2. A process according to claim 1 wherein the thermoplastic film is constituted by a polymerized unsaturated polyester.

3. A process for the manufacture of reinforced polyester sheeting comprising impregnating a fibrous or filamentary reinforcing material with an unsaturated polyester composition comprising a solution of an unsaturated polyester in an olefinically unsaturated monomer, the equivalent ratio of unsaturated monomer to olefinically unsaturated bonds in the polyester chain being 1.0–1.7, to produce a resin impregnated sheet, providing two films of a polymerized unsaturated polyester obtained by polymerizing a solution of an unsaturated polyester in an olefinically unsaturated monomer, the equivalent ratio of unsaturated monomer to olefinically unsaturated bonds in the polyester chain being 1.0–1.7, applying the films to each side of the sheet and subjecting the thus obtained laminate to irradiation with high-energy electrons to polymerize and cure the unsaturated polyester composition, to thereby bond said films integrally to the sheet.

4. A process according to claim 1 wherein the reinforcement is a glass-fiber mat.

5. A process according to claim 1 wherein the reinforcement comprises metal wire.

6. A process according to claim 1 wherein the reinforcement is paper, printed with a decorative pattern.

7. A process according to claim 3 wherein the reinforcement is a glass fiber mat.

8. A process according to claim 3 wherein the reinforcement comprises metal wire.

9. A process according to claim 3 wherein the reinforcement is paper, printed with a decorative pattern.

10. A process according to claim 3 comprising printing the polymerized polyester films before subjecting same to irradiation.

11. A process according to claim 3 comprising coloring the polymerized polyester films before subjecting same to irradiation.

* * * * *